United States Patent
Erhart

[15] 3,706,248
[45] Dec. 19, 1972

[54] NUMERICAL CONTROL APPARATUS FOR A SHEAR

[72] Inventor: John J. Erhart, Cincinnati, Ohio

[73] Assignee: Cincinnati Incorporated, Cincinnati, Ohio

[22] Filed: Jan. 4, 1971

[21] Appl. No.: 103,640

[52] U.S. Cl. .................................... 83/74, 83/263
[51] Int. Cl. ............................................. B26d 5/00
[58] Field of Search......83/74, 75, 76, 234, 241, 263, 83/264, 369, 371, 372

[56] References Cited

UNITED STATES PATENTS

| | | | |
|---|---|---|---|
| 3,608,411 | 9/1971 | Schmidt | 83/76 X |
| 3,468,201 | 9/1969 | Adamson et al. | 83/74 |
| 2,487,031 | 11/1949 | Seybold | 83/263 X |
| 3,490,687 | 1/1970 | Bowman | 83/74 X |
| 3,066,562 | 12/1962 | Burnett | 83/74 |

Primary Examiner—Frank T. Yost
Assistant Examiner—Leon Gilden
Attorney—Melville, Strasser, Foster & Hoffman

[57] ABSTRACT

A numerical control for a shear, making it possible to perform accurately, and without cumulative error, a sequence of cuts on a work piece. Sequence data is entered into an electronic circuit which generates a series of order pulses representative of the data input, and transmits these pulses to a totalizer and to a comparator and to the drive for the gauge bar. Feed back data from the gauge bar, in terms of a series of pulses representative of actual movement of the gauge bar is sent back to the totalizer and to the comparator. Theoretically, when the number of feed back pulses equals the number of order pulses, the gauge bar drive stops. The excess or deficiency in pulses fed back to the comparator with respect to the number of order pulses, is imposed on said order pulses for the succeeding order, to decrease it if the preceding order was overshot, or reduce it if the previous order was undershot, thereby preventing accumulation of errors.

3 Claims, 2 Drawing Figures

INVENTOR/S
JOHN J. ERHART

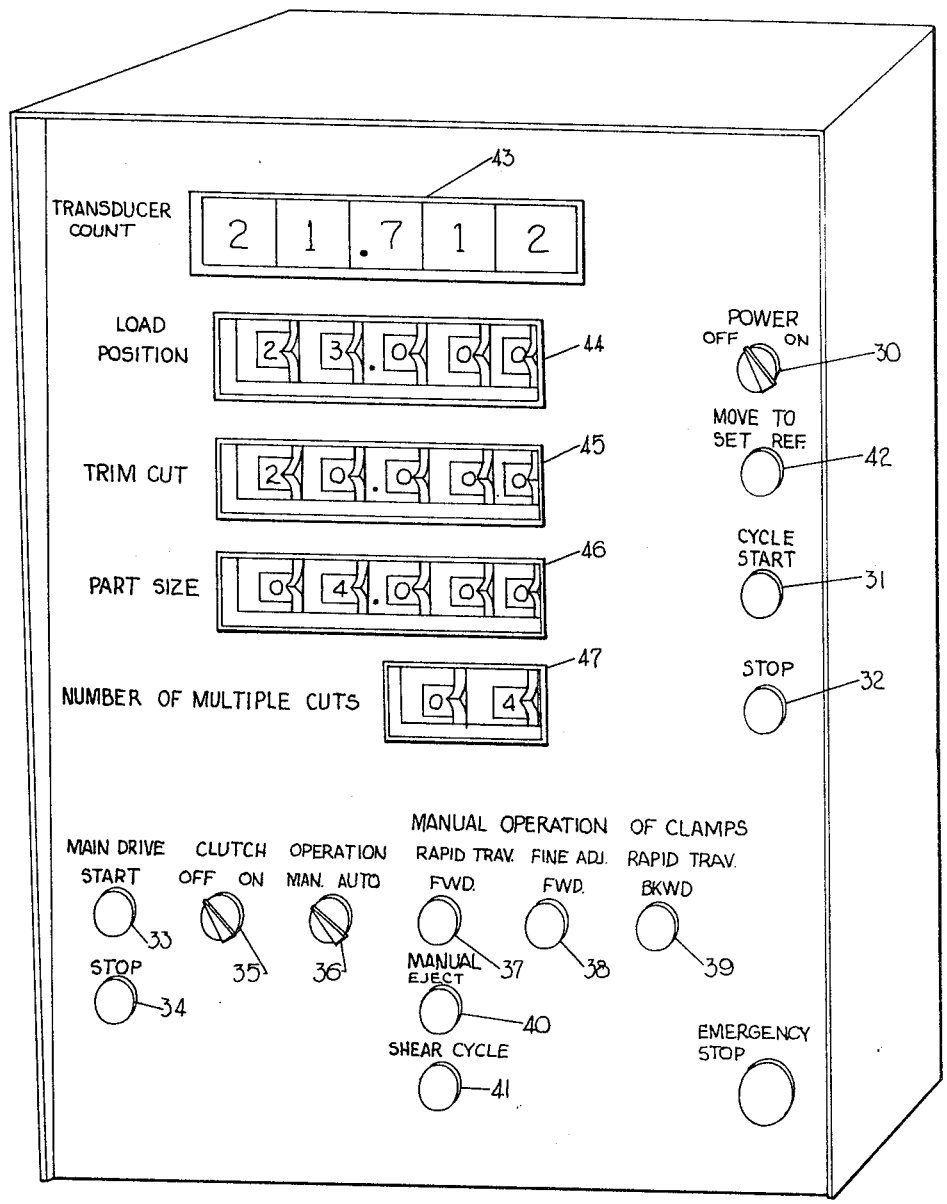

NUMERICAL CONTROL APPARATUS FOR A SHEAR

BRIEF SUMMARY OF THE INVENTION

The invention relates to a numerical control apparatus for a shear. It is often desirable to make a sequence of cuts on a workpiece as, for example, to cut a number of 10 inch pieces from a sheet in an automatic sequence. Such numerical control apparatus is known and generally speaking it involves a complex series of electronic circuits with means whereby an operator can put demand data into the apparatus. A signal is generated to start the drive motor for the front gauge bar of a shear and a feed back circuit feeds data responding to the actual movement of the gauge bar back so that when the order has been completed, the drive motor stops. Circuits are then provided to initiate the machine sequence including the clutch to actuate the shear blade and to signal that the cycle has been completed and that the next command in the sequence should be initiated. Circuits of this type are quite complex but they are known in the art and will not be described herein.

The difficulty which is encountered with devices of this nature is that there is an inherent lack of accuracy at the point at which the gauge bar actually stops in response to the commands received. Thus, the gauge bar may overshoot by a few thousandths of an inch or undershoot by a few thousandths of an inch. Sometimes the over and undershooting balance each other out but more often not, if the machine tends to overshoot it will overshoot on each step of the sequence and the errors for each cut accumulate. If, for example, it is desired to cut five 10 inch pieces from a 50 inch sheet, and the gauge bar overshoots 0.005 inch on each cut, it means that at the completion of the fourth cut the gauge bar will have accumulated an error of 0.020 inch so that the remaining piece will not be 10 inches but rather 9.980 inches. In such a case it is clear that there is substantially ten inches of scrap material.

In the light of the foregoing discussion, the principal object of the present invention is to avoid the accumulation of errors due to overshooting or undershooting, so that while the piece resulting from each cut may be a few thousandths over size or a few thousandths under size, these errors will not accumulate and thus the cycle piece will be within allowable tolerances and will not need to be scrapped.

This object is accomplished by the provision of an electronic comparator to which the signal representing the order is fed, and to which a feed back signal representing actual movement of the gauge bar is fed. The comparator determines the difference between the two and superimposes this difference, in the opposite sense, upon the succeeding order.

Thus, if the signal is in the form of pulses, each pulse representing 0.001 inch of movement desired, and the feed back is in terms of a series of pulses each representing 0.001 inch of actual movement of the gauge bar, the input signal will be a series of 10,000 pulses (one thousand per inch). If now the gauge bar overshoots by 0.005 inch the feed back signal to the comparator will consist of 10,005 pulses. The comparator will determine that there is an excess of five pulses and therefore a minus five pulses will be imposed upon the order and the succeeding cut which will now consist of a series of 9,995 pulses. Similarly, if on the next cut the gauge bar undershoots by five thousandths of an inch, the comparator will note the deficiency of five pulses and plus five pulses will then be imposed upon the next order which will then consist of 10,005 pulses. In this way accumulation of errors resulting from overshooting or undershooting is avoided.

DESCRIPTION OF THE DRAWINGS

FIG. 2 is a perspective view of the control box at the operator's station.

DETAILED DESCRIPTION

Figure 1:
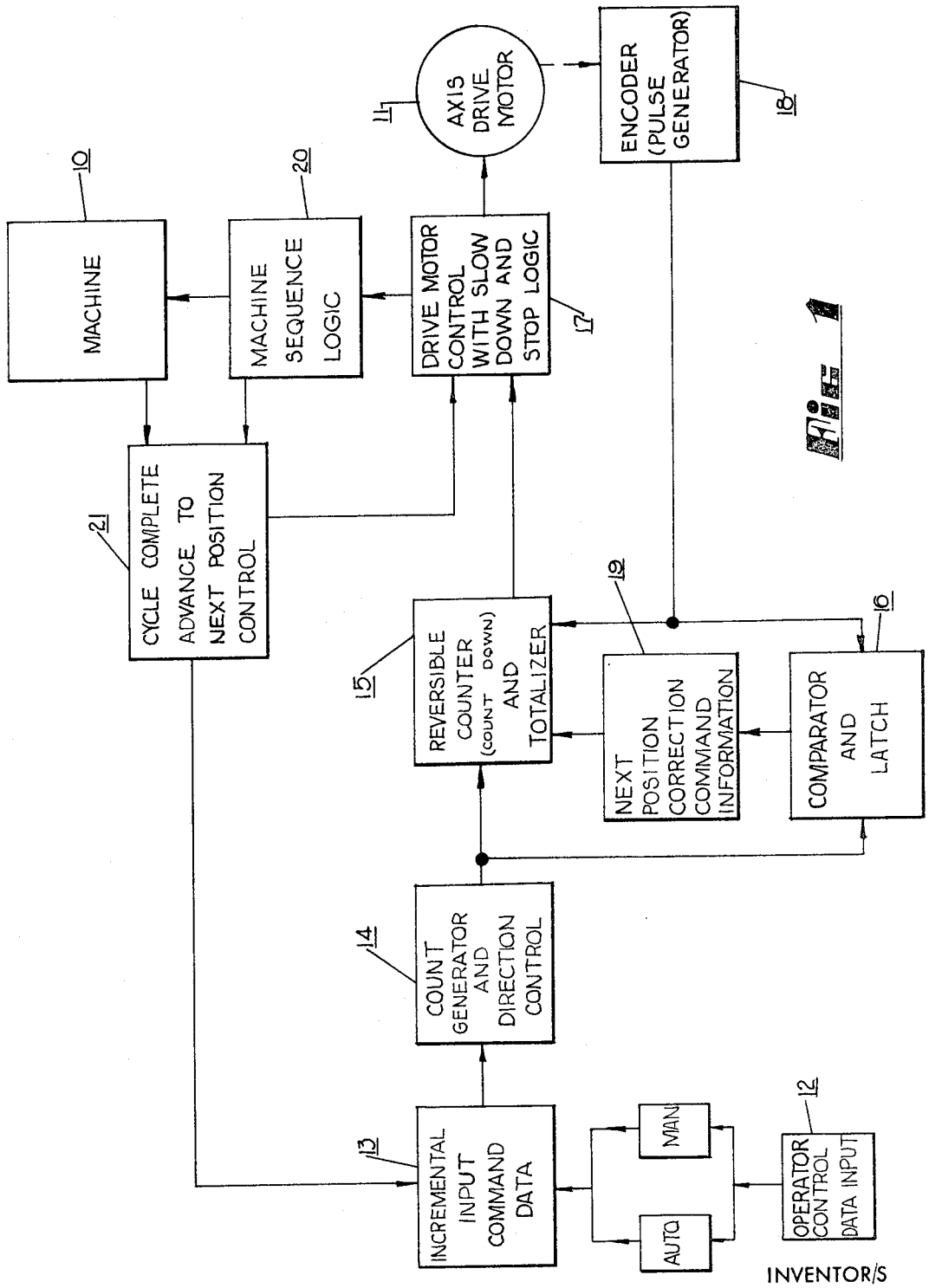
FIG. 1 is a block diagram of the circuitry of the numerical control apparatus.

In the drawing, the shear is represented by the block 10 and the drive for the gauge bar is indicated by the circle 11. The box 12 represents the operator's control panel and as is usual the apparatus may be set for manual or automatic operation.

The box 13 represents the circuitry into which the orders from the control panel are put and this circuit 13 feeds a signal to the circuit indicated by the box 14. This circuit determines the direction of movement of the gauge bar and includes a count generator which will generate a sequence of pulses representative of the gauge bar movements desired. The information from the circuit 14 is fed to a reversible counter and totalizer indicated by the box 16. The order is further transmitted to the circuit represented by the box 17 which starts, slows down and stops the drive motor for the gauge bar which is indicated at 11.

The rotation of the lead screw for the gauge bar drives an encoder and pulse generator indicated by the box 18 which generates a series of pulses, each pulse representing a number of the gauge bar of 0.001 inch. This feed back signal is returned to the reversible counter and totalizer 15 and to the comparator 16. When the number of pulses fed back from the encoder 18 is equal to the number of pulses ordered by the circuit 14, the signal to the circuit 17 slows down and stops the drive motor. However, because of the proclivity of the gauge bar to over or undershoot the pulses generated by the rotation of the feed screw, the number of pulses generated by the device 18 may not be exactly equal to the number of pulses ordered. Since these pulses are also fed to the comparator, the comparator determines the difference and the direction of the device, i.e. excess or deficiency. The signal from the circuit 16 goes to the circuit 19 which applied this difference in a reverse sense to the reversible counter 15 for the next succeeding order as generally outlined above.

As is conventional, it will be noted that the drive motor control also feeds a signal to the machine sequence logic circuit 20 and this circuit then feeds the order signal to the machine 10 and also to the circuit 21. A feed back from the machine 10 to the circuit 21 indicates that the cycle is complete and that the gauge bar should advance to the next position and this signal is transmitted from the circuit 21 back to the first circuit indicated at 13.

In FIG. 2 there is shown an exemplary control panel for the numerical control shear. There is provided the usual power switch 30, the cycle start switch button 31, and cycle stop button 32. There are start and stop switches for the main drive at 33 and 34, a safety switch to shut off the clutch at 35, a switch for either manual or automatic operation at 36 and a series of buttons for manual operation of the clamps. These provide a rapid traverse forward at 37, a fine adjustment forward at 38 and a rapid traverse backward at 39. There is usually a manual eject switch at 40 and a switch 41 to initiate the shear cycle. A button 42 is provided for calibration. Since there is a limit position of proximity to the blade that the gauge bar can move to, it is desirable to calibrate the machine with reference to this point. Thus, actuation of the button 42 causes the gauge bar to move to this ultimate position in proximity to the knife. At this point, the figure in the transducer count window 43 will read 00.000.

A window 44 shows the distance from the reference position to the position for loading a sheet into the shear. Window 45 shows the distance from the reference position at the point where a trim cut is to be made. The window 46 shows the particular size to be cut and the window 47 shows the number of cuts to be made. Thus, in the example shown in FIG. 2, it is desired to obtain five pieces 4 inches in length from a 0.20 inch sheet. This involves four cuts and therefore the window 47 will display the numeral 4. The window 46 will display the numeral 4.000. In the example shown, it is assumed that the piece is exactly 20 inches long and has square ends so that no trim cut is required and therefore the window 45 will display the numeral 20.000.

In order to load the sheet into the machine the gauge bar must retract beyond this position and thus, for example, the load position might be 23 inches from the reference point and thus the window 44 would display the numerals 23.000.

The window 43 at all times displays the actual position of the gauge bar with reference to the reference point. By way of example, the numeral 21.712 displayed in the window 43 shows that the gauge bar has moved from the load position toward the first cut position (there being no trim cut as above pointed out).

If, for example, the workpiece instead of being exactly 20 inches long is 21 inches long or does not have a square end, then obviously a trim cut will be made and this figure can be set in the window 45.

The various circuits referred to herein are such as will be known to and understood by those skilled in the art of electronic numerical control circuitry and these circuits will not therefore be described herein.

The circuits themselves do not form any part of the invention except insofar as they are generally claimed in the claims which follow. No limitations not expressly set forth are intended and none should be implied.

The embodiments of the invention in which an exclusive property or privilege is claimed are defined as follows:

1. In combination, a shear having a gauge bar, and means to move said gauge bar in increments toward the shear knife to perform a sequence of cuts on a sheet of material, an electronic control circuit, means to feed input data to said circuit, said circuit including means to generate a series of pulses representing said input data, a totalizer and a comparator, means to transmit said pulses to said totalizer and to said comparator, said circuit including means to provide an order output to the drive for said gauge bar, an encoder to receive feed back data from said gauge bar and generate a series of pulses responding to actual movement of said gauge bar, means to feed said last named pulses back to said totalizer and to said comparator, said totalizer serving to stop the gauge bar drive when the number of feed back pulses equals the number of input pulses, and means for imposing the excess of deficiency in pulses, as determined by said comparator, upon the order output for the succeeding order, whereby accumulation of errors due to overshooting or undershooting is prevented.

2. The combination of claim 1, wherein said pulse generators generate one pulse for each movement of the gauge bar of 0.001 inch.

3. The combination of claim 1, wherein said pulse generator is arranged to generate a marker pulse at the closest feasible approach of said gauge bar to said knife, whereby said control apparatus is recalibrated for a new sequence of cuts.

* * * * *